United States Patent [19]

Kawanaka et al.

[11] Patent Number: 5,001,196

[45] Date of Patent: Mar. 19, 1991

[54] PROCESS FOR PREPARATION OF DIENE TYPE POLYMER RUBBER

[75] Inventors: Takafumi Kawanaka; Hiroyuki Watanabe, both of Yokohama; Kohkichi Noguchi, Kamakura; Shuichi Akita, Yokohama, all of Japan

[73] Assignee: Nippon Zeon Co., Ltd., Tokyo, Japan

[21] Appl. No.: 330,025

[22] Filed: Mar. 29, 1989

[30] Foreign Application Priority Data

Mar. 31, 1988 [JP] Japan .................................. 63-79003

[51] Int. Cl.$^5$ ............................................... C08F 8/30
[52] U.S. Cl. ..................................... 525/281; 525/283; 525/332.8; 525/332.9; 525/333.1; 525/333.2; 525/375
[58] Field of Search ............... 525/332.8, 332.9, 333.1, 525/333.2, 375, 281, 283

[56] References Cited

U.S. PATENT DOCUMENTS

| | | | |
|---|---|---|---|
| 4,239,860 | 12/1980 | Hergenrother et al. | 525/333.1 |
| 4,616,069 | 10/1986 | Watanabe et al. | 525/332.9 |
| 4,753,991 | 6/1988 | Bronstert | 525/333.2 |

*Primary Examiner*—Bernard Lipman
*Attorney, Agent, or Firm*—Armstrong, Nikaido, Marmelstein, Kubovcik & Murray

[57] ABSTRACT

An improved diene type polymer rubber is prepared by reacting a diene type polymer rubber, to which an alkali metal and/or an alkaline earth metal has been added, with a compound represented by the formula:

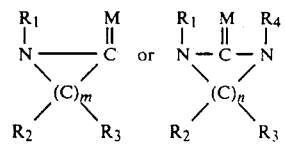

wherein M is oxygen or sulfur, $R_1$ and $R_4$ are a substituent having no hydrogen on the α-carbon atom, $R_2$ and $R_3$ are hydrogen or a hydrocarbon group, m is an integer of at least 2, and n is an integer of 2 to 4. The diene type polymer rubber is characterized in that, even after storage for a long time, the Mooney viscosity rises only to a very slight extent, and the rebound, wet skid resistance and other physical properties of the cured product thereof are not substantially changed.

9 Claims, No Drawings

PROCESS FOR PREPARATION OF DIENE TYPE POLYMER RUBBER

BACKGROUND OF THE INVENTION

(1) Field of the Invention

The present invention relates to a process for the preparation of a diene type polymer rubber and to a modified diene type polymer rubber. More particularly, the present invention relates to a process for the preparation of an improved diene type polymer rubber having an excellent rebound and showing no change of physical properties with the lapse of time, and to this improved diene type polymer rubber.

(2) Description of the Related Art

Recently, requirements for a reduction of the specific fuel consumption and an increase in running safety have become very severe, and to satisfy these requirements, the development of a rubber material having a small rolling resistance (corresponding to a high rebound as a characteristic of the rubber material), a high wet skid resistance, and a high ice skid resistance is needed as the rubber for an automobile tire tread. Furthermore, since tire tread meeting the requirement for a reduction of the specific fuel consumption is designed by sacrificing its abrasion resistance to a certain extent, the demand for an improvement of the abrasion resistance has increased. Nevertheless, it is difficult to satisfy all of these requirements simultaneously, and in general, the wet skid resistance requirement is contradictory to other required properties, such as rolling resistance, ice skid resistance and abrasion resistance. Accordingly, various processes for modifying polymers have been proposed as the means for maintaining a good balance of these characteristics. For example, a styrene/butadiene block copolymer composed of blocks having different glass transition temperatures (Japanese Unexamined Patent Publication No. 60-192739) and an integral rubber having a sequence distribution (K.H. Nordsiek: American Chemical Society, Rubber Division, 125th Meeting, #48, 1984) have been proposed.

The present inventors previously found that if a diene type polymer having an active alkali metal and/or an active alkaline earth metal at terminals of the polymer chain is reacted with a compound having a linkage

(in which M stands for an oxygen atom or a sulfur atom) in the molecule to introduce a specific atomic group in the polymer, the rebound is greatly improved (see U.S. Pat. No. 4,647,625). Subsequently, it was found that not only the rebound but also the abrasion resistance and ice skid resistance are improved by introducing this atomic group into a diene type rubber polymer. Naturally, the effect of improving the rebound, abrasion resistance and ice skid resistance is enhanced with an increase of the addition ratio of the above-mentioned atomic group. Accordingly, the optimum effect is obtained when the above-mentioned atomic group is introduced at all of the terminals of the polymer chain.

A functional group-containing diene type polymer rubber obtained by reaction with a compound having a linkage

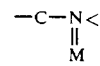

(in which M stands for an oxygen atom or a sulfur atom) has a problem in that, when the rubber is allowed to stand for a long time, even at room temperature, a rise in the Mooney viscosity thereof occurs. It is known that an aliphatic or alicyclic primary amine can overcome this problem (see Japanese Unexamined Patent Publication No. 63-6034), but it is impossible to completely control the rise of the Mooney viscosity by this process, and if the amount of the amine compound added is increased to enhance the control effect, scorching is likely to occur.

SUMMARY OF THE INVENTION

Therefore, the primary object of the present invention is to provide a diene type polymer rubber characterized in that, even after storage for a long time, the Mooney viscosity of the polymer does not rise and the rebound, wet skid resistance and other physical properties of the cured product thereof are not changed.

More specifically, in accordance with the present invention, there is provided a process for the preparation of a diene type polymer rubber, which comprises reacting a diene type polymer rubber, to which an alkali metal and/or an alkaline earth metal has been added, with a compound represented by the following general formula:

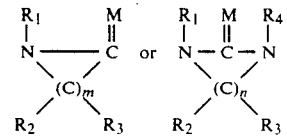

wherein M stands for an oxygen atom or a sulfur atom, $R_1$ and $R_4$ independently stand for a substituent having no hydrogen atom on the carbon atom in the α-position, $R_2$ and $R_3$ independently stand for a hydrogen atom or a hydrocarbon group, m is an integer of at least 2, and n is an integer of from 2 to 4.

Furthermore, in accordance with the present invention, there is provided a diene type polymer rubber obtained by the above-mentioned process.

In accordance with the present invention, a diene type polymer rubber can be obtained in which the Mooney viscosity of the polymer does not rise during storage for a long time and the rebound is harmonized with the wet skid resistance at a high level. Furthermore, since an amine compound need not be added, a rubber having an appropriate scorching time is obtained and there is no risk of scorching during processing.

It is presumed that an increase of the Mooney viscosity of the polymer is generally caused by the reaction of molecules of a modifier added to the polymer chain, and it is considered that, in the present invention, by using the above-mentioned specific compounds (sometimes referred to as "modifier"), the occurrence of the above reaction is prevented, and thus, the rise of the Mooney viscosity of the polymer does not occur.

DESCRIPTION OF THE PREFERRED EMBODIMENTS

The diene type polymer having an alkali metal and/or an alkaline earth metal added thereto, which is used in the present invention, includes (i) a living polymer having an alkali metal and/or an alkaline earth metal bonded to the terminals of a diene type polymer, which is obtained by homopolymerizing a diene type monomer or copolymerizing a diene type monomer with other monomers copolymerizable therewith by using a catalyst based on an alkali metal and/or an alkaline earth metal, and (ii) a polymer obtained by adding an alkali metal and/or an alkaline earth metal to a diene type polymer having conjugated diene units, which is obtained by an optional polymerization process (for example, solution polymerization, emulsion polymerization and the like), by post reaction.

The diene type polymer rubber includes a homopolymer and copolymer of a conjugated diene monomer such as 1,3-butadiene, isoprene, 1,3-pentadiene, 2,3-dimethyl-1,3-butadiene or 1,3-hexadiene, and a copolymer rubber of a conjugated diene monomer as mentioned above with a monomer copolymerizable therewith. As the copolymerizable monomer, there can be mentioned aromatic vinyl compounds such as styrene, α-methylstyrene, vinyltoluene, vinylnaphthalene, divinylbenzene, trivinylbenzene and divinylnaphthalene, unsaturated nitriles such as acrylonitrile, esters of acrylic acid and methacrylic acid, and vinylpyridine, although the monomers that can be used are not limited to the foregoing monomers. As specific examples of the diene type polymer rubber there can be mentioned polybutadiene rubber, a polyisoprene rubber, a butadiene/isoprene copolymer rubber and a butadiene/styrene copolymer rubber.

In the case of, for example a polybutadiene rubber or a styrene/butadiene copolymer rubber, it is known that the rebound and wet skid resistance depend on the amount of the 1,2-linkage in the butadiene portion and the amount of bonded styrene. Accordingly, the amounts of the 1,2-linkage and bonded styrene are appropriately determined according to the required levels of these characteristics, and these amounts are not particularly critical in the present invention.

The diene type polymer rubber having an alkali metal and/or an alkaline earth metal bonded to terminals of the diene type polymer rubber is obtained by forming the above-mentioned diene type polymer rubber by polymerization using a catalyst based on an alkali metal and/or an alkaline earth metal. Namely, this diene type polymer rubber is a living polymer in which an alkali metal and/or an alkaline earth metal is bonded to at least one terminal of the polymer chain and which is in the state before stopping of the polymerization. Customarily used alkali metal-based catalyst, alkaline earth metal-based catalysts, polymerization solvents, randomizers and agents for adjusting the microstructure of conjugated diene units can be used without limitation, and the procedures for preparing the abovementioned polymer are not particularly critical.

The polymer rubber formed by adding an alkali metal and/or an alkaline earth metal to a diene type polymer rubber is obtained by adding an alkali metal and/or alkaline earth metal to a diene type homopolymer or copolymer rubber obtained by homopolymerizing the above-mentioned conjugated diene monomer or copolymerizing the above-mentioned conjugated diene monomer with a monomer copolymerizable therewith by a customary polymerization process such as solution polymerization using an alkali metal-based catalyst, an alkaline earth metal-based catalyst or a Ziegler catalyst or emulsion polymerization using a redox catalyst. As the diene type homopolymer or copolymer used, there can be mentioned, for example, a polybutadiene rubber, a polyisoprene rubber, a butadiene/ styrene copolymer rubber, a butadiene/isoprene copolymer rubber, a polypentadiene rubber, a butadiene/piperylene copolymer rubber and a butadiene/propylene alternating copolymer rubber.

Customary processes can be adopted for adding an alkali metal and/or an alkaline earth metal to the diene type copolymer rubber. For example, the diene type copolymer rubber is subjected to an addition reaction in the presence of an ordinary alkali metal-based catalyst and/or an ordinary alkaline earth metal-based catalyst and a polar compound such as an ether compound, an amine compound or a phosphine compound in a hydrocarbon solvent at a temperature of 30 to 100° C for sores of minutes to scores of hours. The amount of the alkali metal-based catalyst and/or the alkaline, earth metal-based catalyst used is from 0.1 to 10 millimoles per 100 g of the diene type polymer rubber. If the amount of the catalyst is smaller than 0.1 millimole per 100 g of the diene type polymer rubber, the rebound is not improved, and if the amount of the catalyst exceeds 10 millimoles per 100 g of the diene type polymer rubber side reactions, such as crosslinking and cleavage of the polymer, occur and the improvement in the rebound is lessened.

The polar compound is used in an amount of 0.1 to 10 moles, preferably 0.5 to 2 moles, per mole of the alkali metal-based catalyst and/or the alkaline earth-metal-based catalyst. Preferred examples of the alkali metal-based catalyst and alkaline earth metal-based catalyst used for the polymerization and addition reaction are described below.

As the alkali metal-based catalyst, there can be mentioned lithium, sodium, potassium, rubidium and cesium, and their complexes with a hydrocarbon compound or a polar compound. A lithium compound having 2 to 20 carbon atoms is preferred. For example, there can be mentioned ethyllithium, n-propyllithium, i-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, sodium naphthalene, sodium biphenyl, a potassium/tetrahydrofuran complex, a potassium/diethoxyethane complex and a sodium salt of an α-methylstyrene tetramer.

Catalyst systems composed mainly of a compound of barium, strontium, calcium or the like, as disclosed in Japanese Unexamined Patent Publication No. 51-115590, No. 52-9090, No. 52-17591, No. 52-30543, No. 52-48910, No. 52-98077, No. 56-112916, No. 56-118403 and No. 57-100146, can be used as the alkaline earth metal-based catalyst, although the alkaline earth metal-based catalyst that can be used are not limited to those mentioned above.

The polymerization reaction and the reaction of addition of an alkali metal and/or an alkaline earth metal are carried out in, a hydrocarbon solvent or a solvent which does not destroy the alkali metal-based catalyst and/or the alkaline earth metal-based catalyst, such as tetrahydrofuran, tetrahydropyrane or dioxane. An aliphatic hydrocarbon, an aromatic hydrocarbon and an alicyclic hydrocarbon are preferably used as the hydrocarbon solvent, and hydrocarbon solvents having 2 to 12 carbon atoms, such as propane, n-butane, i-butane, n-pentane, i-pentane, n-hexane, cyclohexane, propene, 1-butene, i-butene, trans-2-butene, cis-2-butene, 1-pentene, 2-pentene, 1-hexene, 2-hexene, benzene, toluene, xylene and ethylbenzene, are especially preferred. Mixtures of two or more of these solvents also can be used.

As the compound (modifier) to be reacted with the diene type polymer rubber having an alkali metal and/or an alkaline earth metal added thereto, which is used in the present invention, there can be mentioned (1) a compound represented by the following general formula:

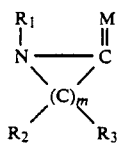

and (2) a compound represented by the following formula:

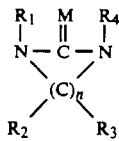

In the foregoing formulae, M stands for an oxygen atom or a sulfur atom, $R_1$ and $R_4$ independently stand for a substituent having no hydrogen atom on the carbon atom in the α-position, that is, a substituent not generating a radical because of extraction of hydrogen from a carbon at the α-position, such as a t-butyl group (which may be substituted or unsubstituted), a phenyl group (which may be substituted or unsubstituted) or a naphthyl group (which may be substituted or unsubstituted) or a benzyl group or a vinyl group, $R_2$ and $R_3$ independently stand for a hydrogen atom or a hydrocarbon group, m is an integer of at least 2 (there is no particular upper limit but m is generally up to about 20), and n is an integer of from 2 to 4.

As examples of the compound (1), there can be mentioned N-t-butyl-β-propio-lactam, N-phenyl-β-propio-lactam, N-t-butyl-2-pyrrolidone, N-phenyl-2-pyrrolidone, N-(4-methoxyphenyl)-2-pyrrolidone, N-vinyl-2-pyrrolidone, N-benzyl-2-pyrrolidone, N-naphthyl-2-pyrrolidone, N-phenyl-5-methyl-2-pyrrolidone, N-t-butyl-5-methyl-2-pyrrolidone, N-t-butyl-1,3-dimethyl-2-pyrrolidone, N-phenyl-2-piperidone, N-naphthyl-2-piperidone, N-t-butyl-2-piperidone, N-methoxyphenyl-e-caprolactam, N-benzyl-s-caprolactam and N-phenyllaurylolactam; and their corresponding sulfur homologues.

As examples of the compound (2), there can be mentioned 1,3-t-butylimidazoline, 1,3-diphenylimidazoline and 1,3-divinylimidazoline; and their corresponding sulfur homologues.

The amount of the compound (1) or (2) used is generally 0.05 to 10 moles, preferably 0.2 to 2 moles, per mole of the alkali metal-based catalyst or alkaline earth metal-based catalyst used for the production of the diene type polymer rubber having an alkali metal and/or an alkaline earth metal added to the terminal thereof, or the alkali metal-based catalyst and/or alkaline earth metal-based catalyst used for the post reaction of adding an alkali metal and/or an alkaline earth metal to the diene type polymer rubber. Since the reaction of the compound (1) or (2) with the living polymer having an alkali metal and/or an alkaline earth metal added to the terminal thereof or the diene type polymer to which an alkali metal and/or an alkaline earth metal is added is advanced rapidly, the reaction temperature and reaction time can be selected within broad ranges, but in general, the reaction is carried out at room temperature to 100° C for several seconds to several hours.

The reaction is accomplished by contacting the alkali metal- and/or alkaline earth metal-added diene type polymer rubber with the compound (1) or (2). For example, there are preferably adopted a process in which a diene type polymer rubber is formed by polymerization using an alkali metal-based catalyst and the formed polymer rubber solution is mixed with a predetermined amount of the compound (1) or (2), and a process in which the alkali metal addition reaction in a diene type polymer rubber solution is carried out and subsequently, the compound (1) or (2) is incorporated to effect the reaction. Of course, the processes that can be adopted are not limited to these processes.

After completion of the reaction, the modified diene type polymer rubber is coagulated by a coagulation method customarily adopted in the preparation of a rubber by solution polymerization, for example, addition of a coagulant, such as an alcohol, to the reaction liquid or steam stripping coagulation, and the coagulation temperature is not particularly critical. For drying the crumb separated from the reaction liquid, a band drier or extrusion type drier customarily used for the preparation of synthetic rubbers can be used, and the drying temperature is not particularly critical.

The compound (1) and/or the compound (2) can be introduced into the terminals of the molecule chain or other portions, but preferably the compound (1) and/or the compound (2) is introduced into the terminals of the molecule chain. In the case of a conjugated diene/ aromatic vinyl copolymer, the improvement of the rebound is further enhanced if a polymer obtained by reacting the living copolymer having a dienyl structure at the terminal of the molecule chain with the compound (1) or (2) is used.

The Mooney viscosity ($ML_{1+4}$, 100° C.) of the modified diene type polymer rubber of the present invention is ordinarily 10 to 200 and preferably 20 to 150. If the Mooney viscosity is lower than 10, the physical properties, such as tensile strength, are degraded, and if the Mooney viscosity is higher than 200, when the polymer rubber is used in combination with another rubber, good compatibility is not attained, the processing operation becomes difficult, and the mechanical properties of a cured product of the obtained rubber composition are degraded.

In general, the modified diene type polymer rubber of the present invention is used singly or in the form of a mixture with another rubber. The modified diene type polymer rubber of the present invention must be contained in an amount of at least 10% by weight, preferably at least 20% by weight, and more preferably at least 30% by weight of the rubber components of the rubber composition. If the amount of the modified diene type polymer rubber is smaller than 10% by weight, the improvement of the rebound is small. Where the rubber of the present invention is used in combination with other rubber, as the other rubber, there can be mentioned a styrene/butadiene copolymer rubber prepared by emulsion polymerization, a polybutadiene rubber prepared by emulsion polymerization, a polybutadiene rubber prepared by solution polymerization using an anionic polymerization catalyst, a Ziegler type catalyst or the like, a stylene/butadiene copolymer rubber by the solution polymerization, a polyisoprene rubber, a butadiene/isoprene copolymer rubber, a polyalkenamer and a natural rubber. At least one member selected from the foregoing rubbers is appropriately used according to the intended object.

In the case of a rubber produced by anionic polymerization, the rebound is further improved by using a rubber coupled with a linkage between carbon and a metal, such as Sn or Si, or a linkage between dienyl and a metal, as mentioned above.

All or some of the rubber components may be an oil-extended rubber.

The rubber composition is prepared by mixing rubber components with various additives by using a mixer such as a roll mixer or a Banbury mixer.

Appropriate additives are selected from those which are customarily used in the rubber industry and used according to the intended object.

For the curing system, there can be used sulfur, stearic acid, zinc oxide, curing accelerators such as thizaole, thiuram and sulfenamide type curing promotors, and organic peroxides. As the reinforcer, there can be used carbon blacks of various grades such as HAF and ISAF, and silica. As the filler, there can be mentioned calcium carbonate and talc, and as other additives, there can be mentioned a process oil, a processing aid, a curing retarder, an antioxidant and the like. The kinds and amounts of these additives are appropriately selected according to the intended object.

In the rubber composition comprising the modified diene type polymer rubber of the present invention the rebound and wet skid resistance can be harmonized with each other at high levels. Accordingly, this rubber composition is especially suitable as the rubber material for an automobile tire tread, and can be also used as a bicycle tire rubber, a shoe sole material, a floor material, a vibration insulating rubber material and the like.

The present invention will now be described in detail with reference to the following examples.

EXAMPLE 1

A stainless steel polymerization vessel having an inner capacity of 2 liters was washed and dried, and the inner atmosphere was substituted with dry nitrogen. Then, the polymerization vessel was charged with 150 g of 1,3-butadiene, 820 g of benzene, 0.5 millimole of diethylene glycol dimethyl ether (diglyme) and 1.3 millimoles of n-butyl lithium (a solution in n-hexane), and the mixture was polymerized at 40° C. for 1 hour with stirring. After completion of the polymerization, 1.0 millimole of a compound shown in Table 1 was added to the reaction mixture, stirring was conducted for 5 minutes and the polymer solution in the polymerization vessel was taken into a methanol solution containing 1.5% by weight of 2,6-di-t-butyl-p-cresol (BHT) to coagulate the formed polymer. The polymer was dried under a reduced pressure at 60° C for 24 hours, and the Mooney viscosity was measured.

Note, at run No. 8 and run No. 9, after the coagulated rubber products were kneaded with 0.3 phr of stearylamine and 0.3 phr of stearylpropylenediamine, respectively, drying was carried out.

The dried rubber was allowed to stand in an oven maintained at 40° C. and the change of the Mooney viscosity with the lapse of time was examined. The results are shown in Table 1.

From the results shown in Table 1, it is seen that, where the modifier of the present invention is incorporated the Mooney viscosity of the obtained polymer rubber does not substantially rise even after 6 weeks' standing.

TABLE 1

| Run No. | Modifier | Mooney viscosity of polymer after standing ($ML_{1+4}$, 100° C.) | | | | |
|---|---|---|---|---|---|---|
| | | 40° C. × 0 weeks | 40° C. × 1 weeks | 40° C. × 2 weeks | 40° C. × 3 weeks | 40° C. × 6 weeks |
| Runs of Present Invention | | | | | | |
| 1 | N-phenyl-2-pyrrolidone | 42.4 | 43.8 | 41.7 | 42.1 | 42.2 |
| 2 | N-t-butyl-2-pyrrolidone | 41.4 | 42.0 | 42.0 | 41.8 | 41.5 |
| 3 | N-benzyl-ε-caprolactam | 43.8 | 44.5 | 43.2 | 44.2 | 44.7 |
| 4 | N-vinyl-2-pyrrolidone | 41.5 | 41.8 | 41.5 | 41.3 | 41.7 |
| 5 | 1,3-diphenyl-imidazolidinone | 42.0 | 42.0 | 41.5 | 43.0 | 42.5 |
| Comparative Runs | | | | | | |
| 6 | N-methyl-pyrrolidone | 42.0 | 49.5 | 55.0 | 59.8 | 63.2 |
| 7 | 1,3-dimethyl-imidazolidone | 41.4 | 46.5 | 46.7 | 48.8 | 51.1 |
| 8 | N-methyl-pyrrolidone + stearyl amine | 43.0 | 46.2 | 48.9 | 51.8 | 56.0 |
| 9 | N-methyl-pyrrolidone + stearylpropylene amine | 44.0 | 43.5 | 45.0 | 46.0 | 46.8 |

EXAMPLE 2

Each of the rubbers shown in Table 1 was kneaded with additives shown in Table 2 on a roll just after the preparation and after 6 weeks, storage at 40° C. Then, each rubber composition was press-cured at 160° C for 25 minutes.

The rebound of the cured rubber was measured at 53° C. by using a Dunlop tripsometer. The wet skid resistance was measured at 25° C on a road surface (ASTM E-303-74, outdoor type B supplied by 3M, black, safety walk) by using a portable skid tester supplied by Stanley. The vinyl content was determined by the infrared method (Morero method).

The scorching time $t_5$ was measured at 160° C. by the apparatus specified in ASTM D-2084-81, and the time required for the torque to increase by 5% of the difference between the maximum and minimum torques observed during a period of 40 minutes from the start of the measurement was designated as the scorching time $t_5$. The results are shown in Table 3.

TABLE 2

| Compounding Recipe | (parts by weight) |
|---|---|
| Polymer | 100 |
| HAF carbon black | 50 |
| Aromatic process oil | 5 |
| Zinc oxide | 3 |
| Stearic acid | 2 |
| Sulfur | 1 |
| N-oxydiethylene-2-benzothiazole sulfenamide | 2 |

TABLE 3

| Run No. | Storage condition* | Vinyl content (%) | Scorching time $t_5$ (min) | Rebound (%) | Wet skid resistance |
|---|---|---|---|---|---|
| Runs of Present Invention | | | | | |
| 1 | a | 70 | 3.8 | 67 | 77 |
|   | b | 70 | 3.8 | 67 | 77 |
| 2 | a | 70 | 3.7 | 66 | 78 |
|   | b | 70 | 3.7 | 67 | 77 |
| 3 | a | 69 | 3.7 | 67 | 77 |
|   | b | 69 | 3.7 | 67 | 77 |
| 4 | a | 70 | 3.9 | 68 | 77 |
|   | b | 70 | 3.9 | 67 | 77 |
| 5 | a | 71 | 3.8 | 67 | 76 |
|   | b | 70 | 3.8 | 67 | 77 |
| Comparative Runs | | | | | |
| 6 | a | 70 | 3.8 | 67 | 77 |
|   | b | 70 | 3.8 | 66 | 77 |
| 7 | a | 69 | 3.8 | 66 | 76 |
|   | b | 69 | 3.8 | 65 | 77 |
| 8 | a | 69 | 3.2 | 68 | 78 |
|   | b | 69 | 3.2 | 66 | 77 |
| 9 | a | 79 | 2.3 | 67 | 77 |
|   | b | 79 | 3.2 | 65 | 77 |

*a: just after preparation
b: after 6 weeks' storage at 40° C.

EXAMPLE 3

A stainless steel bottle-shaped polymerization vessel having an inner capacity of 1.7 liters was washed and dried, and the inner atmosphere was substituted with dry nitrogen. Then, the polymerization vessel was charged with 100 g of 1,3-butadiene and 600 g of cyclohexane, and 2.2 millimoles (calculated as magnesium) of a dibutyl magnesium/triethyl aluminum complex (Mg/Al molar ratio =5.0) and 0.44 millimole of t-butoxybarium were added, and polymerization was carried out at 60° C for 5 hours while stirring the content. After completion of the polymerization, 0.8 millimole of a compound shown in Table 4 was added to the reaction mixture, and the mixture was stirred for 30 minutes. The polymer solution in the polymerization vessel was taken into a methanol solution containing 1.5% by weight of BHT to coagulate the formed polymer, and the coagulated polymer was dried under a reduced pressure at 60° C for 24 hours. The trans-content of the obtained rubber was determined by the infrared method. The obtained rubber was allowed to stand in an oven maintained at 40° C, and the change of the Mooney viscosity, ($ML_{1+4}$, 100° C.) with the lapse of time was examined. The results are shown in Table 4.

TABLE 4

| Run No. | Modifier | Mooney viscosity of polymer after standing at 40° C. | | | | |
|---|---|---|---|---|---|---|
| | | 0 week | 1 week | 2 weeks | 3 weeks | 6 weeks |
| Runs of present Invention | | | | | | |
| 10 | N-phenyl-2-pyrrolidone | 41.8 | 42.4 | 42.0 | 42.1 | 42.1 |
| 11 | N-benzyl-ε-caprolactam | 43.2 | 43.1 | 43.5 | 43.0 | 43.3 |

EXAMPLE 4

The two rubbers obtained in Example 33 were kneaded with additives on a roll according to a recipe shown in table 5, and the formed rubber compositions were press-cured at 160° C. for 25 minutes.

The rebound, wet skid resistance, trans-content and scorching time were determined as described in Example 2. The results are shown in Table 6.

TABLE 5

| Compounding Recipe | (parts by weight) |
|---|---|
| Polymer | 100 |
| HAF carbon black | 50 |
| Aromatic process oil | 5 |
| Zinc oxide | 3 |
| Stearic acid | 2 |
| Sulfur | 1.75 |
| N-oxydiethylene-2-benzothiazole sulfenamide | 1 |

TABLE 6

| Run No. | Storage condition* | Trans-content (%) | Scorching time $t_5$ (min) | Rebound (%) | Wet skid resistance |
|---|---|---|---|---|---|
| Runs of Present Invention | | | | | |
| 10 | a | 83 | 5.2 | 65 | 62 |
|    | b | 83 | 5.2 | 66 | 63 |
| 11 | a | 81 | 5.0 | 64 | 61 |
|    | b | 81 | 5.0 | 65 | 60 |

*a: just after preparation
b: after 6 weeks' storage at 40° C.

We claim:

1. A process for the preparation of a diene type polymer rubber, which comprises reacting a diene type polymer rubber, to which at least one metal selected from the group consisting of alkali metals and alkaline earth metals has been added, with a compound represented by the following general formula

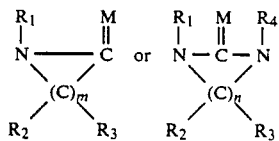

wherein M stands for an oxygen atom or a sulfur atom, $R_1$ and $R_4$ independently stand for a substituent having no labile hydrogen atom on the carbon atom at the alpha position selected from the group consisting of t-butyl, phenyl, naphthyl, or benzyl group which may or may not be substituted, or a vinyl group, $R_2$ and $R_3$ independently stand for a hydrogen atom or a hydrocarbon group, m is an integer of at least 2, and n is an integer of from 2 to 4.

2. The process according to claim 1, wherein the diene type polymer rubber is a living polymer having said metal bonded to the terminal of the molecular chain.

3. The process according to claim 1, wherein the diene type polymer is one formed by adding said metal to a diene type polymer rubber by post reaction.

4. The process according to claim 1 wherein said substituents $R_1$ and $R_4$ have no hydrogen on their alpha carbon atom.

5. The process according to claim 4, wherein the compound represented by the general formula is a lactam.

6. The process according to claim 4, wherein the compound represented by the general formula is an imidazolidone.

7. A diene type polymer rubber obtained by the process according to claim 1.

8. The diene type polymer rubber according to claim 7, wherein the diene type polymer rubber is a homopolymer of a conjugated diene monomer.

9. The diene type polymer rubber according to claim 7, wherein the diene type copolymer rubber is a copolymer of a conjugated diene monomer with a monomer copolymerizable therewith.

* * * * *